United States Patent
Kanda et al.

[11] Patent Number: 5,743,509
[45] Date of Patent: Apr. 28, 1998

[54] ELASTIC MOUNT HAVING TWO AXIALLY COMPRESSED ELASTIC MEMBERS

[75] Inventors: Ryouji Kanda, Komaki; Hideki Nishimura, Minokamo, both of Japan

[73] Assignee: Tokai Rubber Industries, Ltd., Japan

[21] Appl. No.: 683,633

[22] Filed: Jul. 15, 1996

[30] Foreign Application Priority Data

Jul. 17, 1995 [JP] Japan ................................ 7-179993

[51] Int. Cl.⁶ ........................................................ F16M 13/00
[52] U.S. Cl. ........................ 248/635; 248/634; 267/141.2; 267/293
[58] Field of Search ............................... 248/635, 634, 248/632, 633, 621, 609, 638, 570, 613; 267/293, 141, 141.1, 141.3, 141.4, 141.5, 141.2, 153, 294

[56] References Cited

U.S. PATENT DOCUMENTS

| | | | |
|---|---|---|---|
| 4,014,588 | 3/1977 | Kohriyama | 267/141.4 |
| 4,213,718 | 7/1980 | Lumby | 248/635 |
| 4,530,491 | 7/1985 | Bucksbee et al. | 267/141.2 |
| 4,921,203 | 5/1990 | Peterson et al. | 248/635 |
| 5,131,619 | 7/1992 | Daugherty et al. | 248/635 |
| 5,547,172 | 8/1996 | Corcoran | 267/293 |
| 5,580,028 | 12/1996 | Tomczak et al. | 248/635 |

FOREIGN PATENT DOCUMENTS 7-158695  6/1995  Japan.

*Primary Examiner*—Alvin C. Chin-Shue
*Assistant Examiner*—Anita M. King
*Attorney, Agent, or Firm*—Parkhurst & Wendel, L.L.P

[57] ABSTRACT

An elastic mount for elastically connecting two structures, including a first support member including an axial portion and a radial portion resting on the first structure, a second support member disposed radially inwardly of the axial portion of the first support member and bolted to the second structure, a first squeezer member fixed to one of the axial ends of the second support member and extending in a radial direction of the mount, a first axially compressed elastic member compressed between the radial portion of the first support member and the first squeezer member, a second squeezer member fixed to the other end of the second support member and including a radial portion and an axial portion, a second axially compressed elastic member compressed between the radial portion of the second squeezer member and the first structure, and a radially compressed elastic member compressed between the axial portions of said second squeezer member and the first support member.

10 Claims, 5 Drawing Sheets

ELASTIC MOUNT HAVING TWO AXIALLY COMPRESSED ELASTIC MEMBERS

BACKGROUND OF THE INVENTION

1. Field of the Invention

The present invention relates in general to a generally cylindrical elastic mount interposed between two structures for elastically connecting these two structures, and more particularly to such elastic mount which exhibits sufficiently high degrees of spring stiffness in both axial and radial directions thereof and which can be suitably used as body mounts, cab mounts and sub-frame mounts for a motor vehicle, for example.

2. Discussion of the Prior Art

An example of a known cylindrical elastic mount such as a body mount for a motor vehicle is constructed as shown in FIG. 8. This elastic mount is arranged for elastically connecting a first structure 4 and a second structure 14 to each other. The first structure 4, which has a mounting hole 2, is sandwiched by and between a pair of cylindrical elastic blocks 6, 8 each having a relatively large wall thickness. The two cylindrical elastic blocks 6, 8 are superposed on each other within the mounting hole 2 of the first structure 4, and have center bores through which an inner sleeve 10 is inserted. The inner sleeve 10 has a bore, and is secured to the second structure 14 by a bolt 12 extending through the bore. Annular squeezer plates 16, 16 are held in pressing contact with the axial end faces of the inner sleeve 10 and the corresponding axial end faces of the elastic blocks 6, 8, by the bolt 12, such that the elastic blocks 6, 8 are axially compressed by and between the first structure 4 and the two squeezer plates 16, 16.

The elastic blocks 6, 8 in the cylindrical elastic mount constructed as described above exhibit a high degree of spring stiffness with respect to a load applied to the mount in the axial direction, and provide a sufficient vibration dumping effect. With respect to a load applied to the mount in a radial direction thereof, the elastic blocks 6, 8 do not exhibit a sufficiently high degree of spring stiffness and a sufficient vibration damping effect, due to the construction of the mount. Where the elastic mount is used as engine mounts for a motor vehicle, the elastic mount is required to exhibit a high spring stiffness in the radial direction as well as in the axial direction, to assure improved driving comfort and increased running stability of the vehicle. However, the conventional elastic mount suffers from considerable difficulty in meeting this requirement.

In view of the above drawback, there is also known a cylindrical elastic mount constructed as shown in FIG. 9. In this elastic mount, an elastic block 18 is formed between the inner sleeve 10 and an outer sleeve 22 having an outward flange 20, such that the inner and outer sleeves 10, 22 are bonded to the inner and outer circumferential surfaces of the elastic block 18 by vulcanization of a rubber material of the elastic block 18. The outward flange 20 is superposed on the first structure 4 and bolted thereto. Since the elastic block 18 is interposed between the inner and outer sleeves 10, 22 in the radial direction of the elastic mount, a vibrational load applied in the radial direction acts on the elastic block 18 in the radial direction so as to effectively damp the vibrational load.

However, the cylindrical elastic mount shown in FIG. 9 requires the outer sleeve 22 to be bolted or otherwise secured at its outward flange 20 to the first structure 4, resulting in an increased time required for installing the elastic mount on the vehicle. Further, the inside diameter of the elastic block 18 interposed between the inner and outer sleeves 10, 22 is determined by the outside diameter of the inner sleeve 10. The inside diameter of the elastic block 18 determines the effective surface area (as seen in the cross sectional plane of FIG. 9) over which the inner and outer sleeves 10, 22 are opposed to each other in the radial direction, that is, the effective surface area over which the radial load acts on the inner and outer sleeves 10, 22 through the elastic block 18 in a given radial or diametric direction when the radial load is applied between the inner and outer sleeves 10, 22 in that radial direction. Therefore, when the inner sleeve 10 has a relatively small diameter, the above-indicated effective surface area is accordingly reduced, and the spring stiffness of the elastic block 18 in the radial direction tends to be accordingly reduced.

SUMMARY OF THE INVENTION

It is therefore an object of the present invention to provide a generally cylindrical elastic mount which exhibits a sufficiently high degree of spring stiffness in the radial direction.

According to the principle of this invention, there is provided a generally cylindrical elastic mount interposed between a first structure and a second structure, for connecting the first and second structures to each other in a vibration damping manner, the first structure having a mounting hole, the elastic mount comprising: (a) a first support member including an axial portion axially extending through the mounting hole of the first structure, and a radial portion resting on the first structure; (b) a cylindrical second support member disposed radially inwardly of the axial portion of the first support member such that axial opposite end portions of the second support member are exposed axially outwardly of the axial portion; (c) fixing means for fixing the second support member to the second structure; (d) a first squeezer member fixed to one of the axial opposite end portions of the second support member, and extending in a radial direction of the second support member, the first squeezer member being opposed to the radial portion of the first support member in an axial direction of the second support member; (e) a first axially compressed elastic member compressed between the radial portion of the first support member and the first squeezer member in the axial direction; (f) a second squeezer member fixed to the other of the axial opposite end portions of the second support member, the second squeezer member including a radial portion which extends in the radial direction and which is opposed to the first structure in the axial direction, and an axial portion which extends in the axial direction and which is opposed to the axial portion of the first support member in the radial direction; (g) a second axially compressed elastic member compressed between the radial portion of the second squeezer member and the first structure in the axial direction; and (h) a first radially compressed elastic member compressed between the axial portion of the second squeezer member and the axial portion of the first support member in the radial direction.

In the present generally cylindrical elastic mount of the present invention constructed as described above, the radial portion of the first support member is fixed under pressure to the first structure by the elastic forces of the first and second axially compressed elastic members disposed on the opposite sides of the first structure, whereby the first support member is secured to the first structure, without using bolts or other special fixing means associated with the first support member. Accordingly, the present mount can be comparatively easily installed in connection with the first and second structures.

In the present elastic mount, static and dynamic loads in the axial direction act on the first and second axially compressed elastic members, which exhibit a sufficient degree of spring stiffness with respect to the static axial load, and an improved damping effect with respect to the dynamic axial load (axial vibrational load) based on the elastic deformation of those axially compressed elastic members. On the other hand, static and dynamic loads in the radial direction act on the first radially compressed elastic member, which exhibits a sufficient degree of spring stiffness with respect to the static radial load, and an improved damping effect with respect to the dynamic radial load (radial vibrational load) based on the elastic deformation of the first radially compressed elastic member.

Upon application of the radial loads to the elastic mount of the present invention, the first radially compressed elastic member is elastically compressed, and the sufficiently high spring stiffness is provided. This first radially compressed elastic member is interposed between the axial portions of the second squeezer member and the first support member. Therefore, the inside diameter of the first radially compressed elastic member is not influenced or determined by the outside diameter of the second support member. That is, the inside diameter of the radially compressed elastic member can be made considerably larger than the outside diameter of the second support member, thereby making it possible to increase the effective surface area over which the axial portions of the second squeezer member and the first support member are opposed to each other in the radial direction, namely, increase the effective surface area over which the radial load acts on the above-indicated axial portions through the first radially compressed elastic member. Accordingly, the first radially compressed elastic member exhibits an accordingly increased degree of spring stiffness with respect to the radial load.

According to one preferred form of this invention, the axial portion of the second squeezer member is disposed radially outwardly of the axial portion of the first support member, and the elastic mount further comprises a second radially compressed elastic member compressed between the axial portion of the first support member and an outer circumferential surface of the second support member in the radial direction. In this form of the elastic mount, the first and second radially compressed elastic members are disposed radially outwardly and inwardly of the axial portion of the first support member, respectively. Accordingly, the elastic mount exhibits increased overall spring stiffness with respect to the radial loads, based on the elastic deformation of the first and second radially compressed elastic members.

According to another preferred form of the invention, the first squeezer member includes an axial portion disposed radially outwardly of the axial portion of the first support member, and the elastic mount further comprises a third radially compressed elastic member compressed between the axial portion of the first support member and the axial portion of the first squeezer member in the radial direction. In this form of the elastic mount, the first and third radially compressed elastic members are interposed between the axial portion of the first support member and the axial portions of the first and second squeezer members fixed to the opposite axial end portions of the second support member. Thus, the first and third radially compressed elastic members are located at respective different parts of the axial portion of the first support member on the sides of the first and second squeezer members. Accordingly, the present elastic mount exhibits high spring stiffness with respect to a load which causes the first and second support members to be inclined relative to each other in planes parallel to the axial direction of the mount. Such a load has two components which act on the axially opposite end portions of the mount in the radially inward and outward directions, respectively. Since the first and third radially compressed elastic members cooperate to cover a considerably portion of the entire axial length of the mount, the present mount is highly resistant to such load.

In the above preferred form of the invention, the first support member may include an axially intermediate shoulder portion, and a small-diameter and a large-diameter portion on axially opposite sides of the shoulder portion. The shoulder portion provides the radial portion, and the small-diameter and large-diameter portions cooperate to provide the axial portion. More specifically, the small-diameter portion provides a first axial portion extending through the mounting hole of the first structure, while the large-diameter portion provides a second axial portion which cooperates with the axial portion of the first squeezer member to radially compress the third radially compressed elastic member. Thus, the first support member is a one-piece stepped cylindrical member having the axially intermediate radial or stepped portion, and the two axial portions having different diameters. Since the inside diameter of the third radially compressed elastic member is determined by the large-diameter portion of the first support member, the third radially compressed elastic member has an accordingly increased effective surface area over which the radial load is received, whereby the elastic mount exhibits accordingly increased spring stiffness with respect to the radial load.

According to a further preferred form of the invention, one of the first and second squeezer members is integrally fixed to the second support members, while the other of the first and second squeezer members is separate from the second support member and is fixed to the second support member by the fixing means such as a mounting bolt. In this case, the second support member is inserted into the axial portion of the first support member to be attached to the first structure. Then, the first or second squeezer member which is separate from the second support member is positioned in opposed relation with the end face of the second support member when the first or second squeezer member in question is assembled with respect to the first support member. The second support member is subsequently fixed to the second structure by the fixing means, while at the same time the first or second squeezer member in question is fixed to the second support member by the fixing means. Thus, the first and second support members and the first and second squeezer members are assembled into the present elastic mount while at the same time the thus assembled elastic mount is fixed to the first and second structures so as to elastically connect these first and second structures.

For instance, the first squeezer member is welded to one of the axial opposite ends of the second support member, while the second squeezer member is fixed to the other axial opposite end portion of the second support member by the fixing means. In this case, the second support member with the first squeezer member welded at its one end is inserted into the first support member, and the second squeezer member is fixed to the other end of the second support member when the second support member is fixed to the second structure.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
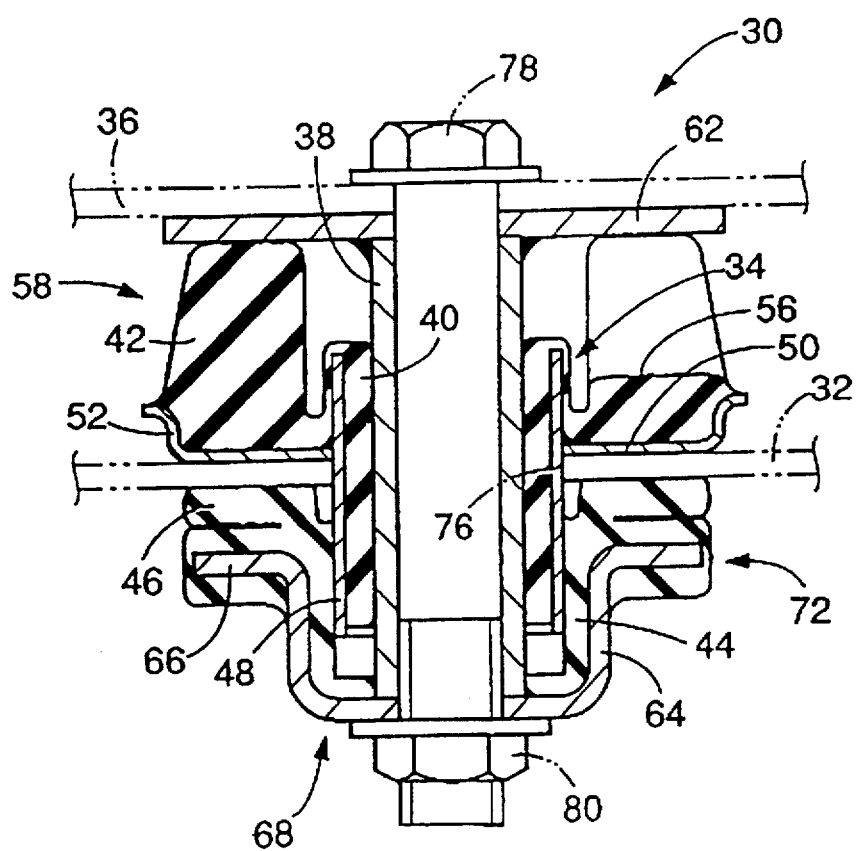
FIG. 1 is a an elevational view in axial cross section of one embodiment of a cylindrical elastic mount of this invention in the form of a body mount for a motor vehicle.

Referring to first to FIGS. 1–5, there is shown a cylindrical elastic mount in the form of a body mount 30 for a motor vehicle, which is constructed according to one embodiment of this invention. The body mount 30 has a first support member 34 to be attached to a frame 32, a second support member 38 to be attached to a body 36 of the vehicle, and four generally cylindrical elastic bodies 40, 42, 44, 46. The body mount 30 is interposed between the frame 32 and the body 36, for elastically securing the frame 32 to the vehicle body 36. The frame 32 and the body 36 are a first and a second structure to be connected to each other by the elastic mount in the form of the body mount 30.

Figure 2:
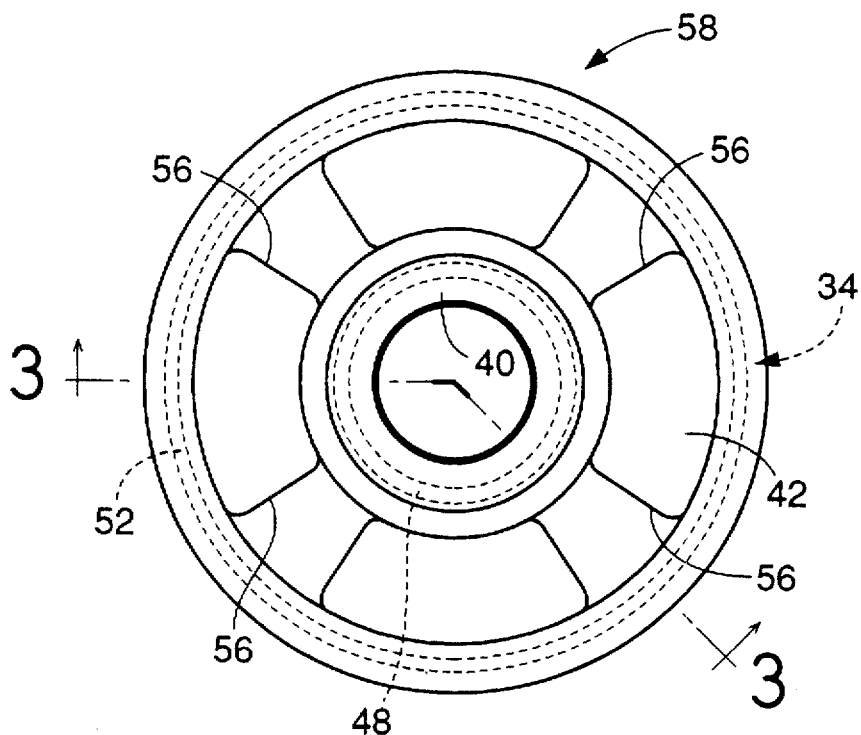
FIG. 2 is a plan view of a first intermediate product which forms a part of the body mount of FIG. 1.
Figure 3:
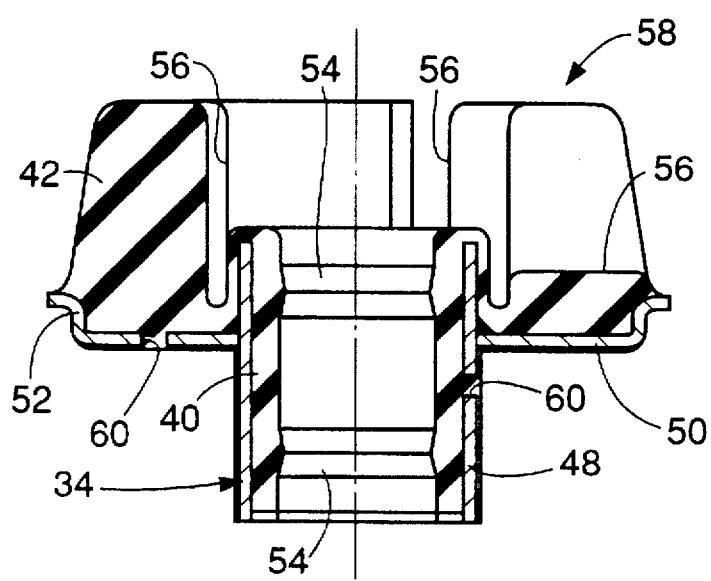
FIG. 3 is a cross sectional view taken along line 3—3 of FIG. 2.

As shown in FIGS. 2 and 3, the first support member 34 includes an axial portion in the form of a sleeve portion 48, and a radial portion in the form of an annular support plate portion 50 which is welded to the sleeve portion 48 such that the support plate portion extends from an axially intermediate part of the sleeve portion 48 in the radially outward direction. The annular support plate portion 50 has a peripheral portion 52 which is bent in an upward direction, namely, in one of the axially opposite directions toward the vehicle body 36 when the body mount 30 is installed on the vehicle.

The first cylindrical elastic body 40 is bonded at its outer circumferential surface to a substantially entire area of the inner circumferential surface of the sleeve portion 48 of the first support member 34, by vulcanization of a rubber material. The first elastic body 40 has a cylindrical wall having a substantially constant radial thickness over the entire axial length. As shown in FIG. 3, the first elastic body 40 has two annular projections 54, 54 formed on its inner circumferential surface such that these projections 54 are spaced apart from each other in the axial direction of the sleeve portion 48. The projections 54 have a relatively small dimension in the radial direction of the elastic body 40, and are formed over the entire circumference of the elastic body 40.

To an upper surface of the annular support plate portion 50 of the first support member 34 as seen in FIGS. 1 and 3, the second cylindrical elastic body 42 is bonded by vulcanization of a rubber material. This second elastic body 42 has a cylindrical wall having a relatively large radial thickness, and four radial slots 56 formed in the radial direction such that the slots 56 are equally spaced apart from each other in the circumferential direction of the elastic mount 10, as shown in FIG. 2. Each radial slot 56 is open in the upper end face and an upper portion of the outer circumferential surface of the elastic body 42. These radial slots 56 are provided to tune the spring characteristics of the second elastic body 42 as desired.

In the present embodiment, the first and second cylindrical elastic bodies 40, 42 are formed integrally with each other, and cooperate with the first support member 34 to constitute a first intermediate product 58 as shown in FIGS. 2 and 3. The sleeve portion 4B and the support plate portion 50 of the first support member 34 have a suitable number of through-holes 60 formed therethrough, so that the rubber material flows through these through-holes 60 onto the outer circumferential surface of the sleeve portion 48 and the lower surface of the support plate portion 50, in the process of vulcanization, so that the above-indicated outer circumferential surface and lower surface are covered at the substantially entire areas thereof with thin rubber layers, which contribute to an increase in the durability of the sleeve and support plate portions 48, 50, and an increase in the strength of bonding of the first and second elastic bodies 40, 42 to the sleeve and support plate portions 48.

Figure 4:
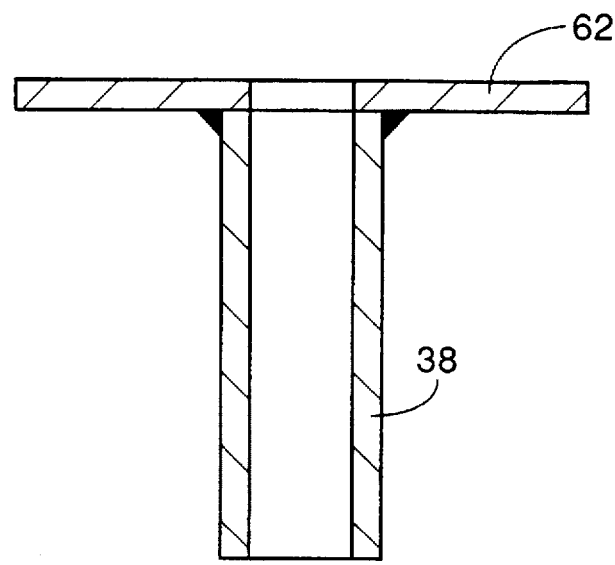
FIG. 4 is an elevational view in axial cross section of a second support member of the body mount of FIG. 1.

The second support member 38, which has a cylindrical shape, has an outside diameter smaller than the inside diameter of the sleeve portion 48 of the first support member 34, and an axial length larger than that of the sleeve portion 48. To the upper end face of the second support member 38, there is welded a first squeezer member 62 in the form of a annular disk having an outside diameter considerably larger than that of the second support member 38, as shown in FIG. 4 as well as in FIG. 1.

Figure 5:
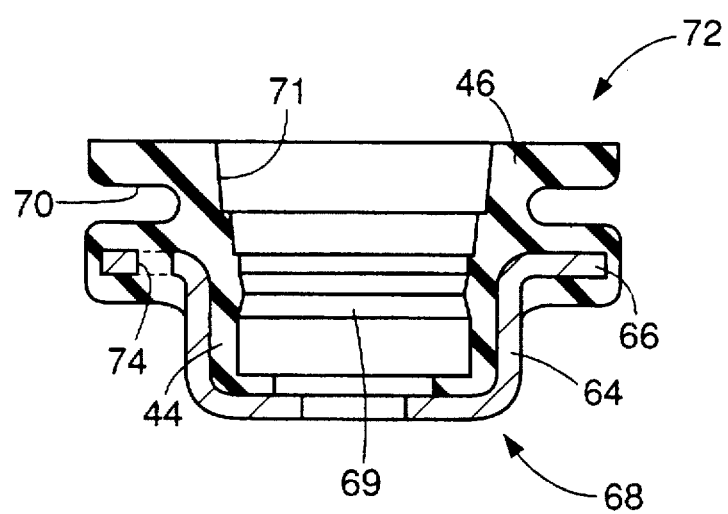
FIG. 5 is an elevational view of a second intermediate product which forms a part of the body mount of FIG. 1.

At the lower end face of the cylindrical second support member 38, there is disposed a generally cup-shaped second squeezer member 6B having an axial portion in the form of a cylindrical portion 64 and a radial portion of the form of a flange portion 66 which extends from the upper open end of the cylindrical portion 64 in the radially outward direction. The cylindrical portion 64 has an inside diameter which is larger than the outside diameter of the second support member 38 by a suitable amount. The second squeezer member 68 is positioned relative to the second support member 38 such that the cylindrical portion 64 is disposed radially outwardly of the lower portion of the second support member 38. As shown in FIG. 5 as well as in FIG. 1, the third cylindrical elastic body 44 is bonded by vulcanization to the substantially entire area of the inner circumferential surface of the cylindrical portion 64 of the second squeezer member 68. This third elastic body 44 has a substantially constant wall thickness. Further, the fourth cylindrical elastic body 46 is bonded by vulcanization to the upper surface of the flange portion 66. This elastic body 46 has a relatively large wall thickness in the radial direction, and has a suitable axial dimension from the upper surface of the flange portion 66. The third elastic body 44 has annular projections 69 formed on its inner circumferential surface such that these projections 69 have a relatively small dimension in the radial direction of the elastic body 44 and are formed over the entire circumference of the elastic body 44. The fourth elastic body 46 has a tapered inner circumferential surface 71 whose diameter increases as the elastic body 46 extends in the upward direction. The elastic body 46 has a circumferential groove 70 formed in its outer circumferential surface over the entire circumference. This circumferential groove 70 is provided to tune the spring characteristics of the elastic body 46 in the axial direction.

In the present embodiment, the third and fourth elastic bodies 44, 46 are formed integrally with each other, and cooperate with the second squeezer member 68 to constitute a second intermediate product 72 as shown in FIG. 5. The flange portion 66 of the second squeezer member 68 has a suitable number of through-holes 74 through which the rubber material of the third and fourth elastic bodies 44, 46 flows onto the rear surface of the flange portion 66, in the process of vulcanization, so that the rear surface of the flange portion 66 is covered by a thin rubber layer, which protects the flange portion 66 and contributes to an increase in the strength of bonding of the fourth elastic body 46 to the second squeezer member 68.

While the second support member 38 is eventually inserted into the second intermediate product 72 and secured thereto by a mounting bolt 78 such that the second support member 38 is held in abutting contact at its lower end face with the inner surface of the second squeezer member 68, the assembling of the second support member 38 and the second intermediate product 72 is effected when the body mount 30 is installed on the vehicle, that is, when the first and second intermediate products 58, 72 and the second support member 38 are assembled into the body mount 30 in mechanical connection with the frame 32 and vehicle body 36, which are the first and second structures of the vehicle to be elastically connected to each other via the body mount 30.

Described in detail, the body mount 30 is interposed between the frame 32 and the body 36 of the vehicle, by first placing the first intermediate product 58 on the frame 32 such that the sleeve portion 48 of the first support member 34 extends downwards through a mounting hole 76 formed through the frame 32 and such that the annular support plate portion 50 rests on the frame 32, as shown in FIG. 1.

Then, the second support member 38 with the first squeezer member 62 welded thereto is forced into the bore of the first cylindrical elastic body 40 bonded to the inner circumferential surface of the sleeve portion 48 of the first support member 34, until the first squeezer member 62 comes into abutting contact with the end face of the second cylindrical elastic body 42 which is formed on the annular support plate portion 50 so as to extend upwards. In this condition, the first elastic body 40 is radially compressed between the sleeve portion 48 and the second support member 38.

In the next step, the vehicle body 36 is placed on the first squeezer member 62 welded to the axial end of the second support member 38, and the second intermediate product 72 is attached to the lower end portion of the sleeve portion 48 of the first support member 34 of the first intermediate product 58, such that the lower end portion of the sleeve portion 48 is received within the second squeezer member 68 of the second intermediate product 72, and such that the axially opposite end portions of the second support member 38 are exposed axially outwardly of the sleeve portion 48. Further, the lower end face of the second support member 38 is opposed to the inner surface of the bottom wall of the second squeezer member 68 of the second intermediate product 72. The third elastic member 44 is radially compressed between the cylindrical portion 64 of the second squeezer member 68 and the sleeve portion 48 of the first support member 34. In this condition, the mounting bolt 78 is inserted through the vehicle body 36, first squeezer member 62, second support member 38 and second squeezer member 68. A nut 80 is threaded and tightened onto a threaded lower end portion of the bolt 78.

In the present body mount 30 assembled as described above, the axial portion in the form of the cylindrical portion 64 of the second squeezer member 68 is fitted on the axial portion in the form of the sleeve portion 48 of the first support member 34 via the third elastic body 44, such that the lower end portion of the sleeve portion 48 is held in pressing contact with the inner circumferential surface of the third elastic body 44 bonded to the inner circumferential surface of the cylindrical portion 64. Further, the fourth cylindrical elastic body 46 which extends upwards from the radial portion in the form of the flange portion 66 of the second squeezer member 68 is pressed at its upper end face against the lower surface of the frame 32, while the second cylindrical elastic body 42 formed on the radial portion in the form of the support plate portion 50 resting on the frame 32 is pressed at its upper end face against the lower surface of the first squeezer member In the above arrangement, the first support member 34 of the first intermediate product 58 is attached to the frame 32 under pressure based on the elastic forces of the second and fourth elastic bodies 42, 46, such that these elastic bodies 42, 46 are axially compressed between the frame 32 (support plate portion 50) and the first and second squeezer members 62, 68 by the bolt 78 and nut 80, which cooperate to fix the second support member 38 to the vehicle body 36.

In the body mount 30 constructed as described above, the first support member 34 is fixed to the frame 32, while the second support member 38 is fixed to the vehicle body 36 via the first squeezer member 62. The four elastic bodies 40, 42, 44, 46 are interposed between the first support member 34 (or the frame 32 to which the first support member 34 is fixed) and the second support member 38 (or the first and second squeezer members 62, 68 attached to the second support member 38). More specifically described, the second elastic body 42 serves as a first axially compressed elastic member which is axially compressed by and between the axially opposed parts of the support plate portion 50 of the first support member 34 and the first squeezer member 62 fixed to the second support member 38. The fourth elastic body 46 serves as a second axially compressed elastic member which is axially compressed by and between the axially opposed part of the frame 32 and the second squeezer member 68 fixed to the second support member 38. The third elastic body 44 serves as a first radially compressed elastic member which is radially compressed by and between the radially opposed parts of the sleeve portion 48 of the first support member 34 and the cylindrical portion 64 of the second squeezer member 68 fixed to the second support member 38. Further, the first elastic body 40 serves as a second radially compressed elastic member which is radially compressed by and between the radially opposed parts of the second support member 38 and the sleeve portion 48 of the first support member 34.

In the present body mount 30, the first support member 34 can be easily secured to the frame 32 (one of the first and second structures to be elastically connected to each other by the body mount 30), without using any special fixing means such as bolts, whereby the body mount 30 can be installed on the vehicle with increased efficiency. Moreover, the present body mount 30 can be installed on the vehicle, by assembling the first intermediate product 58 including the first support member 34, the second intermediate product 72 and the second support member 38. That is, the assembling of the body mount 30 and the installation, thereof on the vehicle can be concurrently achieved, leading to improved overall assembling and installation efficiency of the body mount 30, and reduced number of components required for the manufacture of the body mount 30 and the installation thereof on the vehicle.

The present body mount 30 exhibits a sufficient degree of support strength with respect to a static load (weight) of the vehicle body 36 in the axial direction, based on the spring stiffness of the axially compressed second elastic body 42, and also exhibits an increased damping effect with respect to a dynamic vibrational load in the axial direction, based on the elastic deformation of the axially compressed second and fourth elastic bodies 42, 46.

Further, the present body mount 30 exhibits a sufficiently high degree of spring stiffness with respect to a load applied thereto in the radial direction upon rolling of the vehicle, based on the elastic deformation of the radially compressed first and third elastic bodies 40, 44, whereby the running stability of the vehicle is enhanced. These first and third elastic bodies 40, 44 exhibit their spring stiffness properties independently of each other with respect to the radial load, leading to increased total spring stiffness with respect to the radial load. It is also noted that the sleeve portion 48 and the cylindrical portion 64 by which the third elastic body 44 is radially compressed have diameters considerably larger than the diameter of the second support member 38. This results in an accordingly increased inside diameter of the third elastic body 44, and an accordingly increased effective surface area over which the radial load acts on the sleeve portion 48 and the cylindrical portion 64 through third elastic body 44. Consequently, the third elastic body 44 contributes to a further increase in the radial spring stiffness of the body mount 30.

In the body mount 30 according to the present first embodiment, the sleeve portion 48 of the first support member 34 extends from the frame 32 in the upper and lower directions, and is provided with the first elastic body 40 which is disposed on the upper and lower sides of the frame 32, while being radially compressed between the radially opposed parts of the second support member 38 and the sleeve portion 48 of the first support member 34. In this arrangement, the first elastic body 40 exhibits a sufficiently high degree of spring stiffness with respect to a load which causes the first and second support members 34, 38 to be inclined relative to each other in vertical planes (parallel to the plane of FIG. 1) such that the upper and lower end portions of the first elastic body 40 have different radial thickness values.

Figure 6:
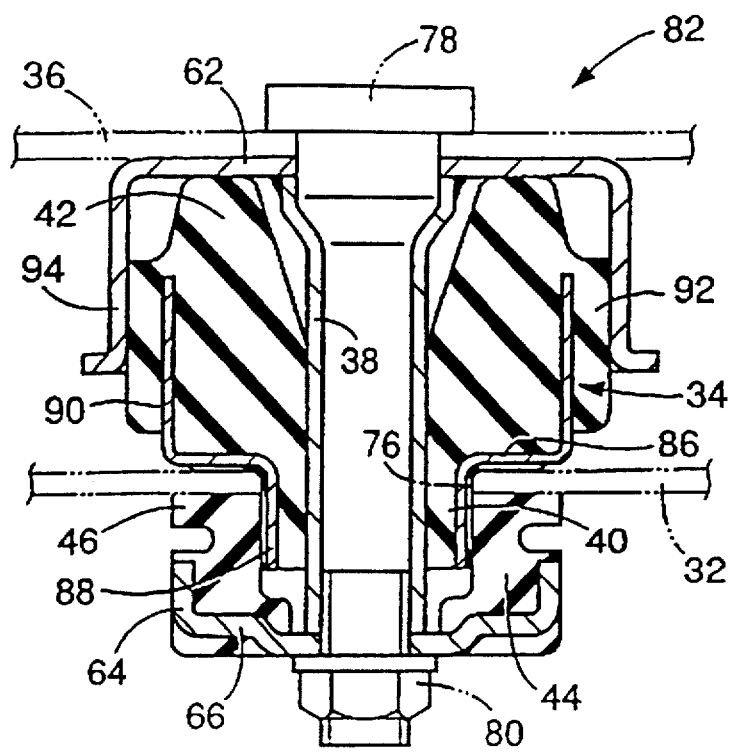
FIG. 6 is an elevational view in axial cross section of a body mount according to another embodiment of the invention.
Figure 7:
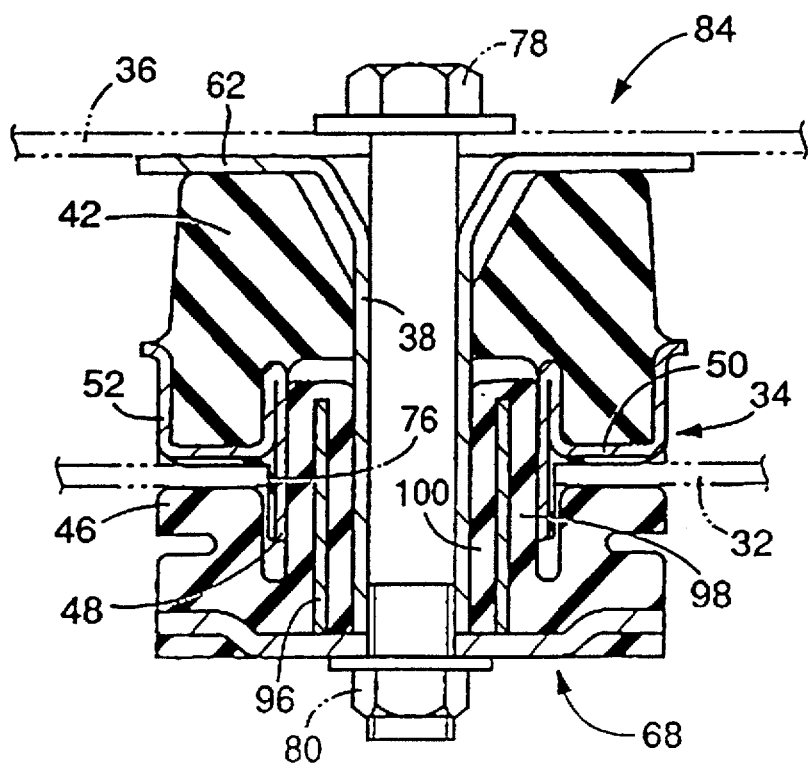
FIG. 7 is an elevational view in axial cross section of a body mount according to a further embodiment of the invention.
Figure 8:
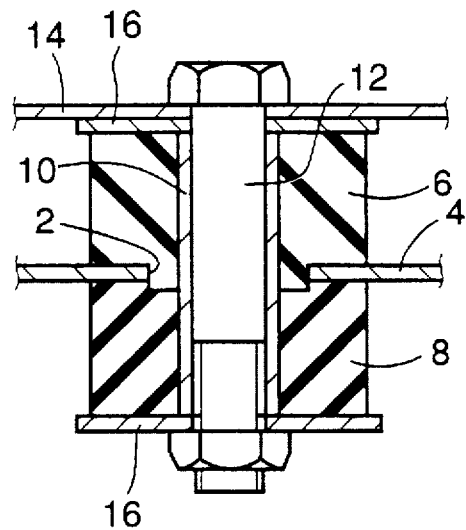
FIG. 8 is an elevational view in axial cross section of an example of a conventional cylindrical elastic mount.
Figure 9:
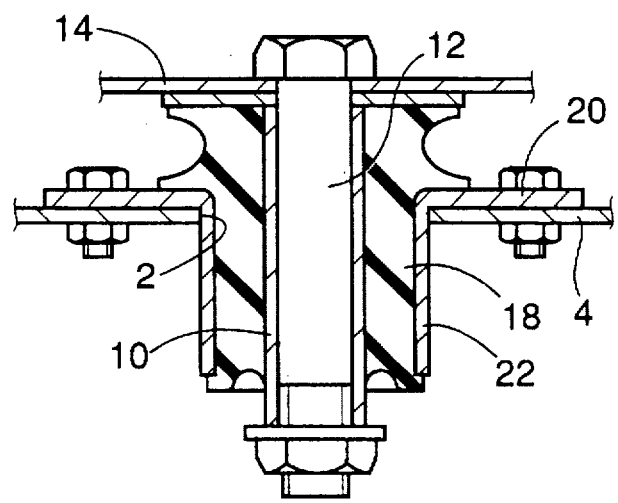
FIG. 9 is an elevational view in axial cross section of another example of a conventional cylindrical elastic mount.

Referring next to FIGS. 6 and 7, there will be described body mounts 82, 84 according to second and third embodiments of this invention. In these figures, the same reference numerals as used in the first embodiments will be used to identify the functionally corresponding elements.

In the body mount 82 of the second embodiment shown in FIG. 6, the first support member 34 is a generally cylindrical member including an axially intermediate shoulder portion 86, and an axially lower small-diameter and an axially upper large-diameter portion 88, 90 which are formed on the lower and upper sides of the shoulder portion 86, respectively. This first support member 34 is positioned relative to the frame 32 such that the small-diameter portion 88 extends through the mounting hole 76 of the frame 32 while the shoulder portion 86 rests on the frame 32.

It will be understood that the small-diameter and large-diameter portions 88, 90 of this first support member 34 serve as an axial portion functionally corresponding to the sleeve portion 48 in the first embodiment, while the shoulder portion 86 serves as a radial portion functionally corresponding to the annular support plate portion 50 in the first embodiment.

In the second embodiment, a fifth cylindrical elastic body 92 is bonded by vulcanization to the substantially entire area of the outer circumferential surface of the large-diameter portion 90. The fifth elastic body 92 has a substantially constant wall thickness over the entire axial length. The fifth elastic body 92 is formed integrally with the first and second elastic bodies 40, 42.

The first squeezer member 62 welded to the second support member 38 has an integrally formed axial portion in the form of a cylindrical portion 94 extending axially toward the second squeezer member 68. The fifth elastic body 92 is radially compressed by and between the radially opposed parts of the cylindrical portion 94 and the large-diameter portion 90 of the first support member 34.

In the present body mount 82, the fifth elastic body 92 serves as a third radially compressed elastic member radially compressed by and between the cylindrical portion 94 and the large-diameter portion 90. Since the cylindrical portion 94 and the large-diameter portion 90 have diameters considerably larger than the diameter of the second support member 38, whereby the fifth elastic body 92 has an accordingly increased effective surface area for receiving the radial load, which leads to a further increase in the spring stiffness of the body mount 82 in the radial direction.

In the present body mount 82, the sleeve portion 88, 90 and the plate portion 86 of the first support member 34 are integral with each other. Namely, the single member 34 having a simple structure provides the sleeve portion 88, 90 and the plate portion 86, contributing structural simplification and an increase in the production efficiency of the body mount 82.

In the body mount 84 of the third embodiment shown in FIG. 7, the second squeezer member 68 bolted to the axial lower end of the second support member 38 is a substantially disc-like member which has a radial portion axially opposed to the frame 32. The disc-like second squeezer member 68 is provided at a relatively radially inner portion thereof with an axial portion in the form of a cylindrical portion 96 fixed thereto. The cylindrical portion 96 has a diameter which is larger than that of the second support member and smaller than that of the sleeve portion 48 of the first support member 34.

To the entire outer circumferential surface of the cylindrical portion 96, there is bonded by vulcanization a sixth cylindrical elastic body 98 having a substantially constant wall thickness. This sixth elastic body 98 is radially compressed between the cylindrical portion 96 and the sleeve portion 48 of the first support member 34. To the entire inner circumferential surface of the cylindrical portion 96, there is bonded by vulcanization of an elastic support member 100 having a substantially constant wall thickness. This elastic support member 100 is interposed between the cylindrical portion 96 and the second support member 38. The sixth elastic body 98 and the elastic support member 100 are formed integrally with the fourth elastic body 46.

In the present body mount 84, the radial spring stiffness is increased by the sixth elastic body 98 interposed between the cylindrical portion 96 and the sleeve portion 48 both of which have larger diameters than the second support member 38.

In the body mount 84, the first support member 34 having the axial portion in the form of the sleeve portion 48 and the radial portion in the form of the support plate portion 50 is formed by pressing from a single sheet member, whereby the body mount 84 is simplified and economically manufactured.

While the presently preferred embodiments of the present invention have been described above in detail by reference to the accompanying drawings, it is to be understood that the invention is not limited to the details of the illustrated embodiments, but may be embodied with various changes, modifications, and improvements, which may occur to those skilled in the art. It is also to be understood that the principle of this invention is equally applicable to various cylindrical elastic mounts other than the body mount, such as cab mounts and sub-frame mounts for motor vehicles.

What is claimed is:

1. A generally cylindrical elastic mount to be interposed between a first structure having a mounting hole and a second structure, for connecting the first and second structures to each other in a vibration damping manner, said elastic mount comprising:

a first support member including an axial portion to be axially extended through the mounting hole of the first structure, and a radial portion to be abutted on the first structure;

a cylindrical second support member disposed radially inwardly of said axial portion of said first support member such that axial opposite end portions of the second support member are exposed axially outwardly of said axial portion;

fixing means for fixing said second support member to the second structure;

a first squeezer member fixed to one of said axial opposite end portions of said second support member, and extending in a radial direction of said second support member, said first squeezer member being opposed to said radial portion of said first support member in an axial direction of said second support member;

a first elastic member to be axially compressed between said radial portion of said first support member and said first squeezer member in said axial direction;

a second squeezer member fixed to the other of said axial opposite end portions of said second support member, said second squeezer member including a radial portion which extends in said radial direction and which is to be opposed to the first structure in said axial direction, and an axial portion which extends in said axial direction and which is opposed to said axial portion of said first support member in said radial direction;

a second elastic member to be axially compressed between said radial portion of said second squeezer member and the first structure in said axial direction; and a third elastic member radially compressed between said axial portions of said second squeezer member and said first support member in said radial direction.

2. The generally cylindrical elastic mount according to claim 1, further comprises a fourth elastic member radially compressed between said axial portion of said first support member and an outer circumferential surface of said second support member in said radial direction, and wherein said axial portion of said second squeezer member is disposed radially outwardly of said axial portion of said first support member.

3. The generally cylindrical elastic mount according to claim 1, further comprises a fifth elastic member radially compressed between said axial portion of said first support member an said axial portion of said first squeezer member in said radial direction, and wherein said first squeezer member includes an axial portion disposed radially outwardly of said axial portion of said first support member.

4. The generally cylindrical elastic mount according to claim 3, wherein said first support member includes an axially intermediate shoulder portion, and small-diameter and large-diameter portions on axially opposite sides of said shoulder portion, said shoulder portion providing said radial portion of said first support member, said small-diameter and large-diameter portions cooperating to provide said axial portion of said first support member, said small-diameter portion providing a first axial portion to be extended through the mounting hole of the first structure, and said large-diameter portion providing a second axial portion which cooperates with said axial portion of said first squeezer member to radially compress said fifth elastic member.

5. The generally cylindrical elastic mount according to claim 1, wherein one of said first and second squeezer members is integrally fixed to said second support member, while the other of said first and second squeezer members is separate from said second support member and is fixed to said second support member by said fixing means.

6. The generally cylindrical elastic mount according to claim 5, wherein said first squeezer member is welded to said one of said axial opposite end portions of said second support member, while said second squeezer member is fixed to said other of said axial opposite end portions of said second support member by said fixing means.

7. The generally cylindrical elastic mount according to claim 1, wherein said axial portion of said second squeezer member is disposed radially inwardly of said axial portion of said first support member.

8. The generally cylindrical elastic mount according to claim 1, wherein said fixing means comprises a bolt to be extended through the second structure, said first squeezer member, said second support member and said second squeezer member, and a nut threaded to a threaded end portion of said bolt.

9. The generally cylindrical elastic mount according to claim 1, wherein said first elastic member has radial slots which are spaced from each other in a circumferential direction of the elastic mount.

10. The generally cylindrical elastic mount according to claim 1, wherein said second elastic member and said elastic member are formed integrally with each other.

* * * * *